United States Patent
Ji et al.

(10) Patent No.: US 12,453,692 B2
(45) Date of Patent: Oct. 28, 2025

(54) TRANSDERMAL DELIVERY COMPOSITE USING COVALENT ORGANIC FRAMEWORK AND POLYMER

(71) Applicant: H&A PHARMACHEM CO., LTD, Gyeonggi-do (KR)

(72) Inventors: Hong Geun Ji, Gyeonggi-do (KR); Young Ah Park, Incheon (KR); Yu Jin Kang, Gyeonggi-do (KR); Seung Yeon Son, Gyeonggi-do (KR)

(73) Assignee: H&A PHARMACHEM CO., LTD, Gyeonggi-Do (KR)

( * ) Notice: Subject to any disclaimer, the term of this patent is extended or adjusted under 35 U.S.C. 154(b) by 599 days.

(21) Appl. No.: 17/782,240

(22) PCT Filed: Nov. 12, 2020

(86) PCT No.: PCT/KR2020/015919
§ 371 (c)(1),
(2) Date: Jun. 3, 2022

(87) PCT Pub. No.: WO2021/112437
PCT Pub. Date: Jun. 10, 2021

(65) Prior Publication Data
US 2023/0018579 A1 Jan. 19, 2023

(30) Foreign Application Priority Data
Dec. 6, 2019 (KR) .................. 10-2019-0161334

(51) Int. Cl.
| | | |
|---|---|---|
| *A61K 8/73* | (2006.01) | |
| *A61K 8/85* | (2006.01) | |
| *A61K 9/70* | (2006.01) | |
| *A61Q 19/00* | (2006.01) | |

(52) U.S. Cl.
CPC ............. *A61K 8/738* (2013.01); *A61K 8/736* (2013.01); *A61K 8/85* (2013.01); *A61K 9/7023* (2013.01); *A61K 2800/57* (2013.01); *A61Q 19/00* (2013.01)

(58) Field of Classification Search
CPC .......... A61K 8/738; A61K 8/736; A61K 8/85; A61K 9/7023; A61K 2800/57; A61K 9/0014; A61K 2800/10; A61K 2800/56; A61K 8/90; A61Q 19/00
See application file for complete search history.

(56) References Cited

U.S. PATENT DOCUMENTS

| | | |
|---|---|---|
| 2008/0220030 A1 | 9/2008 | Alonso Fernandez et al. |
| 2008/0275139 A1 | 11/2008 | Gnaim |
| 2010/0226991 A1* | 9/2010 | Ferey et al. .......... C07F 15/025 977/773 |
| 2015/0150981 A1 | 6/2015 | Gref et al. |

FOREIGN PATENT DOCUMENTS

| | | |
|---|---|---|
| CN | 104174388 A | 12/2014 |
| CN | 104718214 A | 6/2015 |
| CN | 106520747 A | 3/2017 |
| CN | 107837401 A | 3/2018 |
| EP | 2402036 B1 | 2/2018 |
| JP | S61-227517 A | 10/1986 |
| JP | H10-158308 A | 6/1998 |
| JP | 2011-501739 A | 1/2011 |
| KR | 10-2019-0075838 A | 7/2019 |
| WO | WO-2017/165618 A1 | 9/2017 |

OTHER PUBLICATIONS

Liu et al. (Microwave Assisted Rapid Synthesis of gamma Cyclodextrin Metal Organic Frameworks for Size Control and Efficient Drug Loading, Crystal Growth & Design, 2017 (Year: 2017).*
Of Seong et al. (Surfactant-stable and pH-sensitive liposomes coated with N-succinyl-chitosan and chito-oligosaccharide (COS) for delivery of quercetin (Carbohydrate Polymers, 2017 (Year: 2017).*
Ma, X. et al. Approaches and challenges in the synthesis oftlu•ee-dimensional covalent-organic frameworks. Communications Chemistry. 2018. vol. 1. thesis No. 98. pp. 1-15.
Abucafy, M. P. et al. Supramolecular cyclodextrin-based metal-organic frameworks as efficient carrier for anti-inflammatory drugs. European journal of pharmaceutics and biopharmaceutics. 2018. vol. 127. pp. 112-119.
International Search Report from corresponding PCT Application No. PCT/KR2020/015919, dated Feb. 19, 2021.
Rajkumar, T., et al.; "Cyclodextrin-metal-organic framwork (CD-MOF): From synthesis to applications", Journal of Industrial and Engineering Chemistry, vol. 72, 2019, pp. 50-66.
Extended European Search Report from corresponding European Patent Application No. 20895506.2, dated Jan. 5, 2024.

* cited by examiner

*Primary Examiner* — Robert A Wax
*Assistant Examiner* — John Seungjai Kwon
(74) *Attorney, Agent, or Firm* — Harness, Dickey & Pierce, P.L.C.

(57) ABSTRACT

The present invention relates to a transdermal delivery composite comprising a cyclodextrin-based covalent organic framework and polymer. In addition, the present invention relates to a cosmetic composition comprising the transdermal delivery composite, and a method for preparing the transdermal delivery composite.

16 Claims, 9 Drawing Sheets

(a)

(b)

Vapor diffusion crystallization setup (a) γ-CD-COF (b) γ-CD-COF-SC (c) γ-CD-COF-PL (d) γ-CD-COF-PEG-PCL-PEG (e) γ-CD-COF-Retinol (f) γ-CD-COF-PEG-PCL-PEG-Retinol (g) γ-CD-COF-SC-Retinol (h) γ-CD-COF-PL-Retinol

TRANSDERMAL DELIVERY COMPOSITE USING COVALENT ORGANIC FRAMEWORK AND POLYMER

CROSS-REFERENCE TO RELATED APPLICATIONS

This application is a national phase application of PCT Application No. PCT/KR2020/015919, filed on Nov. 12, 2020, which claims the benefit and priority to Korean Patent Application No. 10-2019-0161334, filed on Dec. 6, 2019. The entire disclosures of the applications identified in this paragraph are incorporated herein by references.

TECHNICAL FIELD

The present invention relates to a composite for transdermal delivery comprising a cyclodextrin-based covalent organic framework and a polymer.

In addition, the present invention relates to a cosmetic composition comprising the composite for transdermal delivery.

Furthermore, the present invention relates to a method for preparing the composite for transdermal delivery.

BACKGROUND ART

It is not easy to penetrate active ingredients of cosmetics into the skin. To stabilize an active ingredient and increase transdermal efficiency, effort and study for utilizing a transdermal delivery system (TDS) on functional cosmetics have been actively carried out. Because of developing functional materials, various functionalization methods for imparting higher stability to such materials have been widely studied.

The skin is always exposed to the external environment, and as an important organ to protect the body, it is the most important first line of defense that prevents the loss of body fluids and protects the body from harmful environments. That is, the skin suppresses the loss of water and electrolytes, provides a normal biochemical metabolic environment, and performs a barrier function that protects the human body from mechanical stimuli, ultraviolet rays and various microorganisms. The skin is largely divided into the dermis and the epidermis, and the dermis is in close contact with the subcutaneous fat underneath. The epidermis is a part of the epithelial tissue and consists of five cell layers: the basal layer, the spinous layer, the granular layer, the clear layer and the stratum corneum. The stratum corneum, which exists on the outermost part of the skin, is the primary barrier that performs a barrier function. After Elias et al. proposed a two-compartment model of plaster (keratinocyte interstitial lipid) and brick (keratinocyte), interest in the stratum corneum and the skin barrier has increased. That is, the stratum corneum has the shape of keratinocytes as if they were stacked with bricks, and it is the keratinocyte interstitial lipid that acts like a plaster which supports these keratinocytes. The stratum corneum is composed of about 40% protein, 40% water and 10 to 20% lipid, and its structure is composed of protein-rich keratinocytes and lipids filling the space therebetween. Among them, lipids in particular play a major role as the barrier. The stratum corneum contains a hydrophilic hygroscopic substance called natural moisturizing factor (NMF), which plays an important role in moisturizing the skin. The composition of NMF includes amino acids, pyrrolidone carboxylic acid, urea, ammonia, uric acid, glycosamine, creatinine, citrate, sodium, potassium, calcium, chlorine, magnesium, sugar, organic acid and peptide. In order to maximize the effect of the active ingredient, it can be easily penetrated deep into the skin when the size is smaller than or similar to 100 to 200 nm, which is between skin cell interstitial lipids.

A covalent organic framework (COF) is a two-dimensional or three-dimensional organic solid with an extended structure, in which building blocks are connected by strong covalent bonds. The synthesis of covalent organic frameworks can also be designed through the principles of reticular chemistry developed by Professor Omar M. Yaghi of the United States, similar to the metal-organic framework (MOF). The primary concerns for design in both COF and MOF are porosity and structural regularity. Meanwhile, assembling a building unit for forming a crystalline MOF using a coordination bond is relatively easier than making a crystalline COF using a covalent bond. Design principles for synthesizing inorganic zeolites may also provide additional inspiration for COF designs.

As with other porous organic polymers, attention should be paid to porosity in order to make a COF. The design strategy for forming a porous solid using covalent bonds can be divided into the following two categories. The first is the templating method, which is a method for synthesizing porous zeolite and mesoporous organosilica. It is a method of synthesis using structural-directing agents to form building blocks. After synthesis, the final porous polymer can be made by removing the template. The second method uses rigid building units to create a porous structure. Various types of porous polymer composites were successfully synthesized from rigid monomers by coupling reaction. Most of the porous COF synthesis uses the second method. Meanwhile, the molecular length of the used building unit governs the pore size of the produced COF, and the shape of the building unit determines the topology of the porous structure. Most bonding groups are rigid, flat structures such as boroxines, triazines, imines and hydrazones. In many cases, hard aromatics are preferred as building units because they can efficiently form porous structures.

As an example of using such a covalent organic framework, Korean Patent Application Laid-Open No. 10-2018-0069242 discloses the use of an organic framework having a triazine group formed through nitrile trimerization as a gas collector.

PRIOR ART PUBLICATION

Patent Publication

Korean Patent Application Laid-Open No. 10-2018-0069242

SUMMARY

Problems to be Solved

Accordingly, the technical problem of the present invention is the provision of a new composite for transdermal delivery which can efficiently deliver an active ingredient into the skin in a stable manner.

In addition, another technical problem of the present invention is the provision of a cosmetic composition comprising the composite for transdermal delivery.

Furthermore, still another technical problem of the present invention is the provision of a method for preparing the composite for transdermal delivery.

Technical Means

To solve the above technical problem, the present invention provides a composite for transdermal delivery comprising a cyclodextrin-based covalent organic framework (CD-COF) and a polymer.

In addition, the present invention provides a cosmetic composition comprising the composite for transdermal delivery.

In addition, the present invention provides a method for preparing a composite for transdermal delivery comprising: i) dissolving cyclodextrin, potassium base and a polymer in a solvent, ii) forming crystals in the crystallization solvent from the solution obtained in step (i) using a gas diffusion crystallizer and iii) washing the crystals formed in step (ii) and drying the crystals.

The present invention is described in detail hereinafter.

According to one aspect to the present invention, there is provided a composite for transdermal delivery comprising a cyclodextrin-based covalent organic framework (CD-COF) and a polymer.

In the present invention, a cyclodextrin-based covalent organic framework (CD-COF) is included as a component of the composite for transdermal delivery.

In the present invention, a cyclodextrin-based covalent organic framework is prepared. Cyclodextrin is a cyclic oligosaccharide, produced through enzymatic conversion from starch, and 5 or more D-glucopyranoside units are linked through 1→4 bonds. Those having 6, 7 and 8 glucose subunits in cyclodextrins are called alpha($\alpha$)-cyclodextrin, beta($\beta$)-cyclodextrin and gamma($\gamma$)-cyclodextrin, respectively.

In one embodiment according to the present invention, the cyclodextrin is alpha-cyclodextrin, beta-cyclodextrin or gamma-cyclodextrin. In another embodiment according to the present invention, the cyclodextrin is gamma-cyclodextrin.

In another embodiment according to the present invention, a cyclodextrin-based covalent organic framework is prepared from cyclodextrin and potassium salt. In another embodiment according to the present invention, the potassium salt is potassium hydroxide (KOH).

In the present invention, a polymer is included as a component of the composite for transdermal delivery.

In another embodiment according to the present invention, the polymer is a biodegradable polymer. In another embodiment according to the present invention, the polymer is selected from the group consisting of chitosan, pullulan, polylactic acid, succinylated chitosan, pullulan-poly-(L)-lactic acid, a triblock copolymer of polyethylene glycol (PEG)-polycaprolactone (PCL)-polyethylene glycol (PEG) and mixtures thereof. In another embodiment according to the present invention, the polymer is selected from the group consisting of succinylated chitosan, pullulan-poly-(L)-lactic acid, a triblock copolymer of polyethylene glycol (PEG)-polycaprolactone (PCL)-polyethylene glycol (PEG) and mixtures thereof.

In the present invention, succinylated chitosan can be synthesized according to a method known in the art—for example, it can be obtained by reacting succinyl anhydride with chitosan.

In the present invention, polylactic acid can be synthesized according to a method known in the art—for example, it can be obtained by reacting pullulan with lactide using triethylamine (TEA) as a catalyst.

In the present invention, the triblock copolymer of polyethylene glycol (PEG)-polycaprolactone (PCL)-polyethylene glycol (PEG) can be synthesized according to a method known in the art. For example, PEG-PCL-PEG of triblock copolymers can be synthesized by forming a diblock copolymer of PEG-PCL with methoxypoly(ethylene glycol) (mPEG) and $\varepsilon$-caprolactone, and then linking them to each other.

In the present invention, the polymer forms a composite with a cyclodextrin-based covalent organic framework to improve the transdermal delivery effect.

In another embodiment according to the present invention, 0.01 to 100 parts by weight of a polymer forms a composite for transdermal delivery, based on 10 parts by weight of a cyclodextrin-based covalent organic framework.

In another embodiment according to the present invention, the composite for transdermal delivery further comprises an active ingredient. In the present invention, there is no specific limitation according to the active ingredient. In the present invention, the active ingredient may be, for example, one or more selected from the group consisting of a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent, a natural product, oil, wax, butter, paraffin, a higher fatty acid, an ester and a silicone, but it is not limited thereto.

Examples of moisturizer include, but are not limited to, creatine, polyglutamic acid, sodium lactate, hydroproline, 2-pyrrolidone-5-carboxyclic acid sodium salt, hyaluronic acid, sodium hyaluronate, ceramide, phytosterol, cholesterol, sitosterol and proteoglycan. Examples of whitening agent include, but are not limited to, arbutin and a derivative thereof, kojic acid, bisabolol, niacinamide, vitamin C and a derivative thereof, placenta and allantoin. Examples of anti-wrinkle agent include, but are not limited to, retinol, retinol derivative, adenosine, licorice extract, red ginseng extract and ginseng extract. Examples of UV blocking agent include, but are not limited to, benzophenone derivative, para-aminobenzoic acid derivative, methoxycinnamic acid derivative and salicylic acid derivative. There is no special limitation to a hair growth promoter, but it may be preferably a blood circulation promoter and/or a hair follicle stimulant. Examples of blood circulation promoter include, but are not limited to, the extract of Swertia japonica Makino, cepharanthin, vitamin E and a derivative thereof and gamma-oryzanol, and examples of hair follicle stimulant include, but are not limited to, capsicum tincture, ginger tincture, cantharides tincture and nicotinic acid benzyl ester. Examples of vitamin or a derivative thereof include, but are not limited to, vitamin A (retinol) and a derivative thereof, vitamin B1, vitamin B2, vitamin B6, vitamin E and derivatives thereof, vitamin D, vitamin H, vitamin K, pantothenic acid and derivatives thereof, biotin, panthenol, coenzyme Q10 and idebenone. Examples of amino acid or peptide include, but are not limited to, cystine, cysteine, methionine, serine, lysine, tryptophan, amino acid extract, epidermal growth factor (EGF), insulin-like growth factor (IGF), fibroblast growth factor (FGF), copper tripeptide-1, tripeptide-29, tripeptide-1, acetyl hexapeptide-8, nicotinoyl tripeptide-35, hexapeptide-12, hexapeptide-9, palmitoyl pentapeptide-4, palmitoyl pentapeptide-3, palmitoyl tetrapeptide-7, palmitoyl tripeptide-29, palmitoyl tripeptide-1, nonapeptide-7, tripeptide-10 citrulline, sh-polypeptide-15, palmitoyl tripeptide-5, diaminopropionoyl tripeptide-33 and r-spider polypeptide-1. Examples of anti-inflammatory agent include, but are not limited to, beta-glycyrrhetinic acid, glycyrrhetinic acid derivative, aminocaproic acid, hydrocortisone, β-glucan, madecaside and licorice. Examples of acne therapeutic agent include, but are not limited to, estradiol, estrogen, ethinyl estradiol, triclosan and azelaic acid. Examples of microbicide include, but are not limited to, benzalkonium chloride, benzethonium chloride and halocalban. There is no special limitation to female hormone, but it may be preferably estrogen. As estrogen, it may be preferably estradiol, ethinyl estradiol or isoflavone which is a phytoestrogen. Examples of keratolytic agent include, but are not limited to, sulfur, salicylic acid, AHA, BHA and resorcin. Examples of the extract of natural product or an ingredient obtained therefrom include, but are not limited to, the extract of Japanese witch-hazel, *Lamium album* var. *barbatum, Hedyotis diffusa, Rheum palmatum*, licorice, aloe, chamomile, rose hip, horse chestnut, ginseng, *Luffa aegyptiaca*, cucumber, laver, sea mustard, *Dioscorea batatas*, snail and fruit of *Dioscorea polystachya*, the extract of green tea, or curcumin, hinokitiol and beta-carotene.

In addition, as the active ingredient, cosmetic ingredients such as oil, wax, butter, paraffin, higher fatty acids such as stearic acid, esters such as cetylethylhexanoate and silicone may be used. As the oil, for example, olive oil, camellia oil, avocado oil, macadamia oil, castor oil, sunflower oil, jojoba oil, almond oil, apricot seed oil, green tea oil, meadowfoam seed oil or argan oil, etc. may be used, but it is not limited thereto. As the wax, for example, carnauba wax, candelilla wax, jojoba oil, beeswax, lanolin, soybean wax, rice wax, silicone wax and the like may be used, but it is not limited thereto. As the butter, for example, shea butter, mango butter, green tea butter, soy butter and the like may be used, but it is not limited thereto. As the hydrocarbon, for example, liquid paraffin, paraffin, petrolatum, ceresin, microcrystalline wax or squalane may be used, but it is not limited thereto. As the higher fatty acids, for example, lauric acid, myristic acid, palmitic acid, stearic acid, isostearic acid, oleic acid, linoleic acid or linolenic acid may be used, but it is not limited thereto. As the higher alcohol, for example, lauryl alcohol, myristyl alcohol, cetyl alcohol, stearyl alcohol, oleyl alcohol or behenyl alcohol may be used, but it is not limited thereto. As the esters, for example, 2-octyldodecyl myristate, cetyl 2-ethyl hexanoate, diisostearyl maleate or cetylethyl hexanoate may be used, but it is not limited thereto. As the silicone, for example, dimethicones, cyclomethicones, silicone polymers or silicone oil may be used, but it is not limited thereto.

In addition to the above, yeast extract, collagen, elastin, aluminum sucrose octasulfate, DHA, EPA, flavor ingredient and the like may be used.

According to another aspect of the present invention, there is provided a cosmetic composition comprising the composite for transdermal delivery of the present invention. In the present invention, the cosmetic composition may be formulated to toner, lotion, body lotion, cream, essence and the like, but it is not limited thereto.

The cosmetic composition comprises preferably 1 to 60% by weight, more preferably 2 to 50% by weight of the composite for transdermal delivery according to the present invention. In the present invention, if the cosmetic composition comprises the composite for transdermal delivery in an amount of less than 1% by weight, the effect according to an active ingredient may be weak, and if the amount of the composite for transdermal delivery is greater than 60% by weight, it may be economically undesirable since increasing the effect according to an active ingredient commensurately with the added amount would not be expected.

According to another aspect of the present invention, there is provided a method for preparing a composite for transdermal delivery comprising: i) dissolving cyclodextrin, potassium base and a polymer in a solvent, ii) forming crystals in the crystallization solvent from the solution obtained in step (i) using a gas diffusion crystallizer and iii) washing the crystals formed in step (ii) and drying the crystals.

In one embodiment according to the present invention, the cyclodextrin is alpha-cyclodextrin, beta-cyclodextrin or gamma-cyclodextrin. In another embodiment according to the present invention, the cyclodextrin is gamma-cyclodextrin.

In another embodiment according to the present invention, the potassium salt is potassium hydroxide (KOH).

In another embodiment according to the present invention, the polymer is a biodegradable polymer. In another embodiment according to the present invention, the polymer is selected from the group consisting of chitosan, pullulan, polylactic acid, succinylated chitosan, pullulan-poly-(L)-lactic acid, a triblock copolymer of polyethylene glycol (PEG)-polycaprolactone (PCL)-polyethylene glycol (PEG) and mixtures thereof. In another embodiment according to the present invention, the polymer is selected from the group consisting of succinylated chitosan, pullulan-poly-(L)-lactic acid, a triblock copolymer of polyethylene glycol (PEG)-polycaprolactone (PCL)-polyethylene glycol (PEG) and mixtures thereof.

In another embodiment according to the present invention, the solvent of step (i) is selected from the group consisting of water, propylene glycol and mixtures thereof.

In another embodiment according to the present invention, 0 to 200 parts by weight of cyclodextrin, 1 to 100 parts by weight of potassium base and 0.01 to 50 parts by weight of the polymer are dissolved based on 100 parts by weight of the solvent in step (i).

In the present invention, step (ii) proceeds by forming crystals in the crystallization solvent from the solution obtained in step (i) using a gas diffusion crystallizer.

In the present invention, the formation of crystals using the gas diffusion crystallizer is performed by erecting a column in the center of the gas diffusion crystallizer, putting the solution obtained in step (i) without closing the cap, placing the crystallization solvent around the column and then sealing and leaving the gas diffusion crystallizer so that air is not passed. Crystals are formed in the column as the crystallization solvent diffuses.

In one embodiment according to the present invention, the crystallization solvent in step (ii) is selected from the group consisting of methanol, ethanol and mixtures thereof.

In one embodiment according to the present invention, the active ingredient may be further dissolved in a solvent in step (i).

In one embodiment according to the present invention, the active ingredient may be one or more selected from the group consisting of a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent, a natural product, oil, wax, butter, paraffin, a higher fatty acid, an ester and a silicone, but it is not limited thereto.

Effect of the Invention

A composite for transdermal delivery according to the present invention can show excellent efficacy even with a small amount of an active ingredient for a long time by efficiently transferring an active ingredient into the skin in a very stable form.

DETAILED DESCRIPTION

Figure 1:
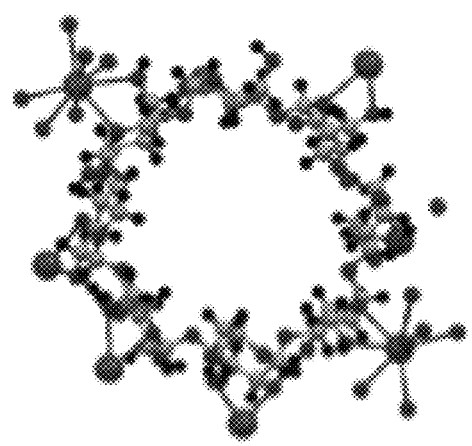
FIG. 1 is a schematic diagram representing the structure of a cyclodextrin-based covalent organic framework.

Hereinafter, the present invention is explained in more detail with the following examples. However, it must be understood that the protection scope of the present invention is not limited to the examples.

Preparation Example 1: Preparation of Succinylated Chitosan 160 mL of methanol was added to 40 mL of lactic acid aqueous solution (5% v/v), and then 0.5 g of chitosan was dissolved with stirring. 1.0 g of succinyl anhydride was added thereto, and the resulting solution was left at room temperature for 24 hours while stirring. Succinylated chitosan was precipitated by adjusting the pH to 7.4 with 5N NaOH and centrifuged at 5,000 rpm for 5 min at 37° C. The centrifuged product was resuspended in distilled water, followed by dialysis against distilled water for 72 hours (dialysis tubing cellulose, molecular weight cut-off 14,000) and then lyophilized for 3 days.

Preparation Example 2: Preparation of pullulan-poly-(L)-lactic acid 0.2 g of purified pullulan was dissolved in 11 mL of DMSO by stirring at room temperature under dry nitrogen. 1 g of L-lactide was added to the obtained pullulan solution and then stirred in an oil bath preheated to 70 to 75° C. When the mixture was completely dissolved, 0.17 mL of triethylamine (TEA) as a catalyst was introduced. After 12 hours of reaction, the reaction solution was filtered through a 0.5 μm syringe filter. The filtrate was dialyzed against distilled water using a dialysis membrane (MWCO: 10,000) for 2 days, and the distilled water was exchanged every 2 hours for the first 12 hours. The product was lyophilized for 3 days and then stored at −20° C. until use.

Preparation Example 3: Preparation of Triblock Copolymer of PEG-PCL-PEG

Polyethylene glycol (PEG)-polycaprolactone (PCL)-polyethylene glycol (PEG) triblock copolymer was prepared by dividing it into two steps. The first step was the formation of a diblock copolymer of methoxypoly(ethylene glycol) (mPEG) and ε-caprolactone (ε-CL), and the second step was the linkage of two diblock copolymer molecules by the use of hexamethylene diisocyanate (HMDI).

Figure 2:
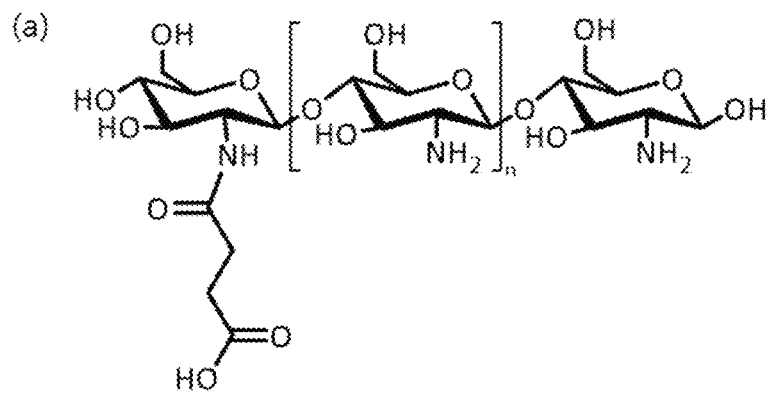
FIG. 2 is a chemical structural formula of (a) succinylated chitosan and (b) pullulan-poly-(L)-lactic acid.
Figure 2:
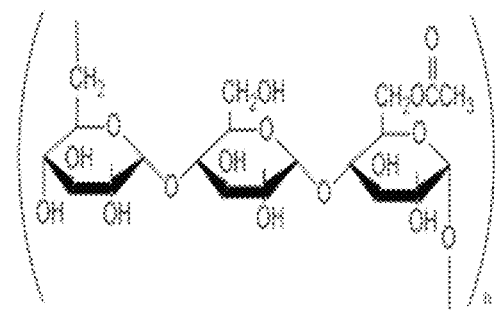
Figure 3:
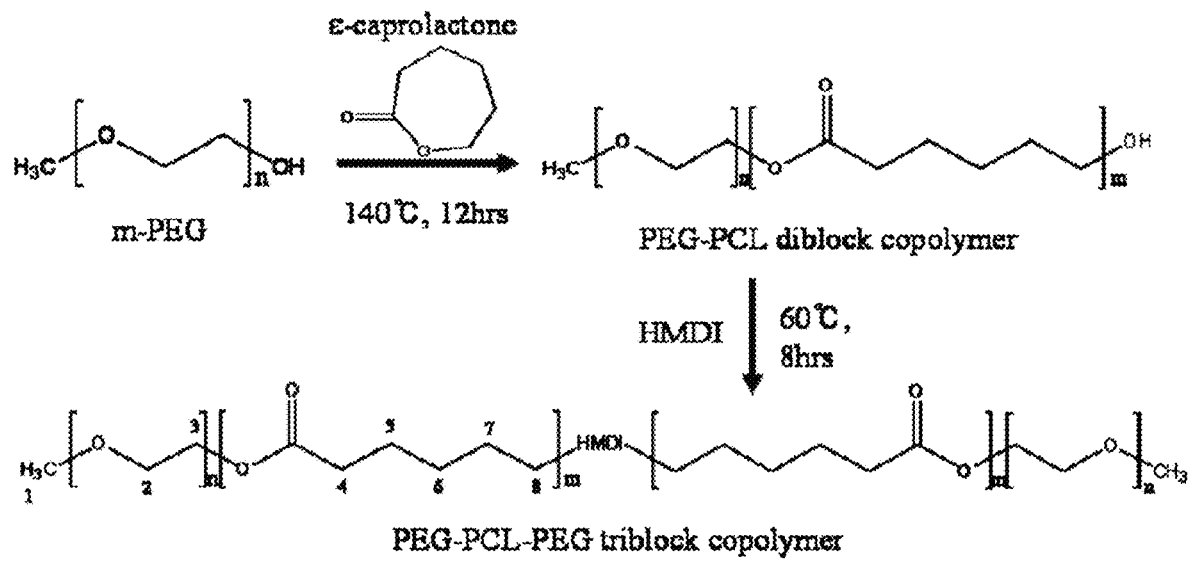
FIG. 3 is a schematic diagram representing the synthetic procedure of a triblock copolymer of PEG-PCL-PEG.

First, after removing residual moisture using a Dean stark trap, 8.06 g of mPEG was completely dissolved in 80 mL of anhydrous toluene for 25 minutes and then vacuum dried for 3 hours. After that, 4.03 g of ε-CL as a monomer and 1.61 g of $SnOct_2$ as a catalyst were added, respectively, and reacted at 140° C. for 14 hours. Then, HMDI was added to the reaction mixture and reacted at 60° C. for 8 hours. The obtained product was isolated in diethyl ether and the residual solvent was removed under vacuum to obtain a PEG-PCL-PEG triblock copolymer. All reactions were carried out under a nitrogen atmosphere. The synthesis schematic of the PEG-PCL-PEG triblock copolymer is shown in FIG. 2. The weight average molecular weight of the synthesized PEG-PCL-PEG triblock copolymer was set to 10,000.

Preparation Example 4: Preparation of a Cyclodextrin-Based Covalent Organic Framework (Hereinafter "CD-COF")

Figure 4:
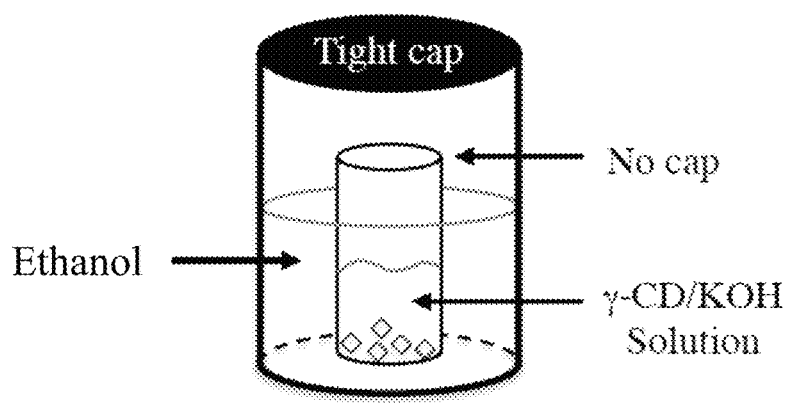
FIG. 4 is a schematic diagram representing a gas diffusion crystallizer.
Figure 5:
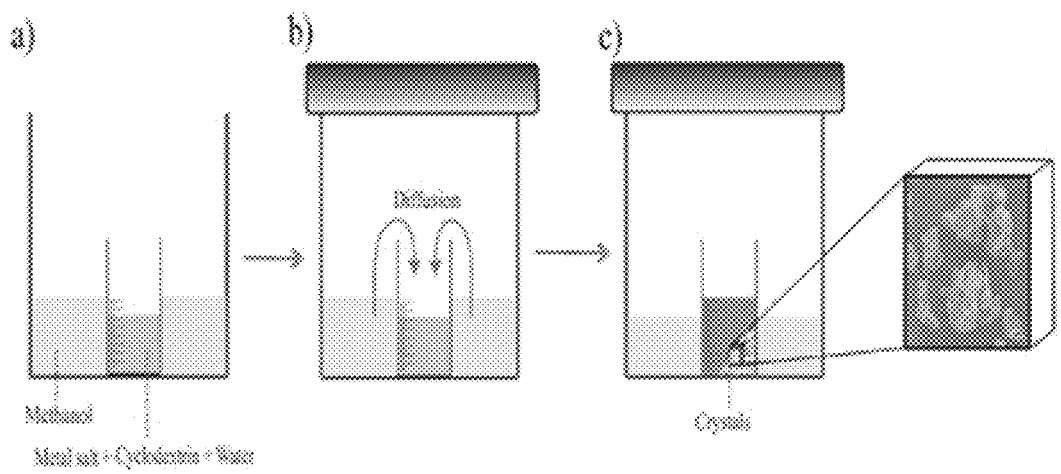
FIG. 5 is a schematic diagram representing the formulation of a crystal using a gas diffusion crystallizer.

390 g of cyclodextrin (alpha, beta or gamma) and 135 g of KOH were dissolved in 600 g of distilled water. After preparing a gas diffusion crystallizer as shown in FIG. 4, a column was erected in the center, and a solution in which cyclodextrin and KOH are dissolved in distilled water was put there, without closing the cap, and a crystallization solvent (ethanol or methanol) was put around the column. When the gas diffusion crystallizer was sealed so that air was not passed and left to stand, crystals started to form in the column after about 12 hours at room temperature as the crystallization solvent was diffused (FIG. 5). The experiment was terminated after 24 hours, and the formed crystals were washed and dried for 24 hours.

Example 1: Preparation of a Composite of CD-COF and Polymer 390 g of cyclodextrin (alpha, beta or gamma), 135 g of KOH and 5 g of polymer (succinylated chitosan, pullulan-poly-(L)-lactic acid or triblock copolymer of PEG-PCL-PEG) were dissolved in 600 g of distilled water. After preparing a gas diffusion crystallizer, a column was erected in the center, and a solution in which cyclodextrin, KOH and the polymer are dissolved in distilled water was put there, without closing the cap, and a crystallization solvent (ethanol or methanol) was put around the column. When the gas diffusion crystallizer was sealed so that air was not passed and left to stand, crystals started to form in the column after about 12 hours at room temperature as the crystallization solvent was diffused. The experiment was terminated after 24 hours, and the formed crystals were washed and dried for 24 hours.

Example 2: Preparation of a Composite of CD-COF Containing Retinol and Polymer 390 g of cyclodextrin (alpha, beta or gamma), 135 g of KOH, 10 g of polymer (succinylated chitosan, pullulan-poly-(L)-lactic acid or triblock copolymer of PEG-PCL-PEG) and 20 g of retinol were dissolved in 700 g of distilled water. After preparing a gas diffusion crystallizer, a column was erected in the center, and a solution in which cyclodextrin, KOH, the polymer and retinol were dissolved in distilled water was put there, without closing the cap, and a crystallization solvent (ethanol or methanol) was put around the column. When the gas diffusion crystallizer was sealed so that air was not passed and left to stand, crystals started to form in the column after about 12 hours at room temperature as the crystallization solvent was diffused. The experiment was terminated after 24 hours, and the formed crystals were washed and dried for 24 hours.

Example 3: Preparation of a Composite of CD-COF Containing Curcumin and Polymer 390 g of cyclodextrin (alpha, beta or gamma), 135 g of KOH, 10 g of polymer (succinylated chitosan, pullulan-poly-(L)-lactic acid or triblock copolymer of PEG-PCL-PEG) and 20 g of curcumin were dissolved in 700 g of distilled water. After preparing a gas diffusion crystallizer, a column was erected in the center, and a solution in which cyclodextrin, KOH, the polymer and curcumin were dissolved in distilled water was put there, without closing the cap, and a crystallization solvent (ethanol or methanol) was put around the column. When the gas diffusion crystallizer was sealed so that air was not passed and left to stand, crystals started to form in the column after about 12 hours at room temperature as the crystallization solvent was diffused. The experiment was terminated after 24 hours, and the formed crystals were washed and dried for 24 hours.

Example 4: Preparation of a Composite of CD-COF Containing Plant Natural Products and Polymer It was prepared in the same manner as in Example 2 with the composition shown in Table 1 below.

TABLE 1

| Ingredient | Content (part by weight) |
| --- | --- |
| CD-COF | 5 |
| PEG-PCL-PEG triblock copolymer | 5 |
| Extract of green tea | 10 |
| KOH | 2 |
| Distilled water | 24 |

Example 5: Preparation of a Composite of CD-COF Containing Marine Natural Products and Polymer It was prepared in the same manner as in Example 2 with the composition shown in Table 2 below.

TABLE 2

| Ingredient | Content (part by weight) |
| --- | --- |
| CD-COF | 6 |
| Pullulan-poly-(L)-lactic acid | 7 |
| Extract of laver | 10 |
| KOH | 3 |
| Distilled water | 22 |

Example 6: Preparation of a Composite of CD-COF Containing Oils and Polymer

It was prepared in the same manner as in Example 2 with the composition shown in Table 3 below.

TABLE 3

| Ingredient | Content (part by weight) |
| --- | --- |
| CD-COF | 5 |
| Succinylated chitosan | 5 |
| Avocado oil | 1 |
| Olive oil | 3 |
| Camellia oil | 1 |
| Macadamia oil | 1 |
| Castor oil | 2 |
| Sunflower oil | 2 |
| Jojoba oil | 2 |
| Almond oil | 1 |
| Meadowfoam seed oil | 2 |
| Argan oil | 2 |
| KOH | 3 |
| Distilled water | 38 |

Example 7: Preparation of a Composite of CD-COF Containing Waxes and Polymer It was prepared in the same manner as in Example 2 with the composition shown in Table 4 below.

TABLE 4

| Ingredient | Content (part by weight) |
| --- | --- |
| CD-COF | 5 |
| Succinylated chitosan | 10 |
| Beeswax | 4 |
| Silicone wax | 4 |
| KOH | 4 |
| Distilled water | 33 |

Example 8: Preparation of a Composite of CD-COF Containing Butters and Polymer It was prepared in the same manner as in Example 2 with the composition shown in Table 5 below.

TABLE 5

| Ingredient | Content (part by weight) |
|---|---|
| CD-COF | 15 |
| PEG-PCL-PEG triblock copolymer | 1 |
| Shea butter | 2 |
| Mango butter | 5 |
| Green tea butter | 1 |
| KOH | 5 |
| Distilled water | 45 |

Example 9: Preparation of a Composite of CD-COF Containing Paraffin and Polymer

It was prepared in the same manner as in Example 2 with the composition shown in Table 6 below.

TABLE 6

| Ingredient | Content (part by weight) |
|---|---|
| CD-COF | 20 |
| Pullulan-poly-(L)-lactic acid | 10 |
| Paraffin | 12 |
| KOH | 6 |
| Distilled water | 52 |

Example 10: Preparation of a Composite of CD-COF Containing Higher Fatty Acids and Polymer It was prepared in the same manner as in Example 2 with the composition shown in Table 7 below.

TABLE 7

| Ingredient | Content (part by weight) |
|---|---|
| CD-COF | 10 |
| PEG-PCL-PEG triblock copolymer | 0.5 |
| Stearic acid | 10 |
| KOH | 3 |
| Distilled water | 32 |

Example 11: Preparation of a Composite of CD-COF Containing Esters and Polymer

It was prepared in the same manner as in Example 2 with the composition shown in Table 8 below.

TABLE 8

| Ingredient | Content (part by weight) |
|---|---|
| CD-COF | 13 |
| Succinylated chitosan | 1.5 |
| Cetylethylhexanoate | 20 |
| KOH | 3 |
| Distilled water | 46 |

Example 12: Preparation of a Composite of CD-COF Containing Silicones and Polymer It was prepared in the same manner as in Example 2 with the composition shown in Table 9 below.

TABLE 9

| Ingredient | Content (part by weight) |
|---|---|
| CD-COF | 30 |
| PEG-PCL-PEG triblock copolymer | 10 |
| Dimethicone 6CS | 20 |
| KOH | 5 |
| Distilled water | 62 |

Example 13: Preparation of a Composite of CD-COF Containing Moisturizers and Polymer It was prepared in the same manner as in Example 2 with the composition shown in Table 10 below.

TABLE 10

| Ingredient | Content (part by weight) |
|---|---|
| CD-COF | 25 |
| Succinylated chitosan | 10 |
| Ceramide 3 | 3 |
| Hyaluronic acid | 0.5 |
| Polyglutamic acid | 1 |
| KOH | 5 |
| Distilled water | 65 |

Example 14: Preparation of a Composite of CD-COF Containing Whitening Agents and Polymer It was prepared in the same manner as in Example 2 with the composition shown in Table 11 below.

TABLE 11

| Ingredient | Content (part by weight) |
|---|---|
| CD-COF | 16 |
| Pullulan-poly-(L)-lactic acid | 1 |
| Arbutin | 15 |
| KOH | 2 |
| Distilled water | 52 |

Example 15: Preparation of a Composite of CD-COF Containing UV Blocking Agents and Polymer It was prepared in the same manner as in Example 2 with the composition shown in Table 12 below.

TABLE 12

| Ingredient | Content (part by weight) |
|---|---|
| CD-COF | 20 |
| PEG-PCL-PEG triblock copolymer | 10 |
| Octyl methoxycinnamate | 20 |
| KOH | 4 |
| Distilled water | 50 |

Example 16: Preparation of a Composite of CD-COF Containing Vitamins and Polymer It was prepared in the same manner as in Example 2 with the composition shown in Table 13 below.

TABLE 13

| Ingredient | Content (part by weight) |
| --- | --- |
| CD-COF | 30 |
| Succinylated chitosan | 10 |
| Alpha-tocopherol | 10 |
| KOH | 5 |
| Distilled water | 72 |

Example 17: Preparation of a Composite of CD-COF Containing Amino Acids and Polymer It was prepared in the same manner as in Example 2 with the composition shown in Table 14 below.

TABLE 14

| Ingredient | Content (part by weight) |
| --- | --- |
| CD-COF | 20 |
| Pullulan | 0.1 |
| Fibroblast growth factor (FGF) | 0.01 |
| Epidermal growth factor (EGF) | 0.0001 |
| Insulin-like growth factor (IGF) | 0.001 |
| KOH | 4 |
| Distilled water | 53 |

Example 18: Preparation of a Composite of CD-COF Containing Peptides and Polymer It was prepared in the same manner as in Example 2 with the composition shown in Table 15 below.

TABLE 15

| Ingredient | Content (part by weight) |
| --- | --- |
| CD-COF | 30 |
| Chitosan | 20 |
| Palmitoyl pentapeptide-3 | 0.0001 |
| Hexa peptide-9 | 0.001 |
| Palmitoyl tetrapeptide-7 | 0.00001 |
| Nonapeptide-7 | 0.0001 |
| Dipeptide-8 | 0.001 |
| KOH | 5 |
| Distilled water | 84 |

Example 19: Preparation of a Composite of CD-COF Containing Anti-Inflammatories and Polymer It was prepared in the same manner as in Example 2 with the composition shown in Table 16 below.

TABLE 16

| Ingredient | Content (part by weight) |
| --- | --- |
| CD-COF | 10 |
| Polylactic acid | 1.5 |
| Extract of Centella asiatica (madecaside) | 15 |
| KOH | 3 |
| Distilled water | 38 |

Example 20: Preparation of a Composite of CD-COF Containing Acne Therapeutic Agents and Polymer It was prepared in the same manner as in Example 2 with the composition shown in Table 17 below.

TABLE 17

| Ingredient | Content (part by weight) |
| --- | --- |
| CD-COF | 4 |
| Pullulan | 0.5 |
| Azelic acid | 10 |
| KOH | 4 |
| Distilled water | 38 |

Example 21: Preparation of a Composite of CD-COF Containing Microbicides and Polymer It was prepared in the same manner as in Example 2 with the composition shown in Table 18 below.

TABLE 18

| Ingredient | Content (part by weight) |
| --- | --- |
| CD-COF | 30 |
| Chitosan | 15 |
| Halocalban | 20 |
| KOH | 5 |
| Distilled water | 65 |

Experimental Example 1: Measurement of Particle Distribution

Figure 6:
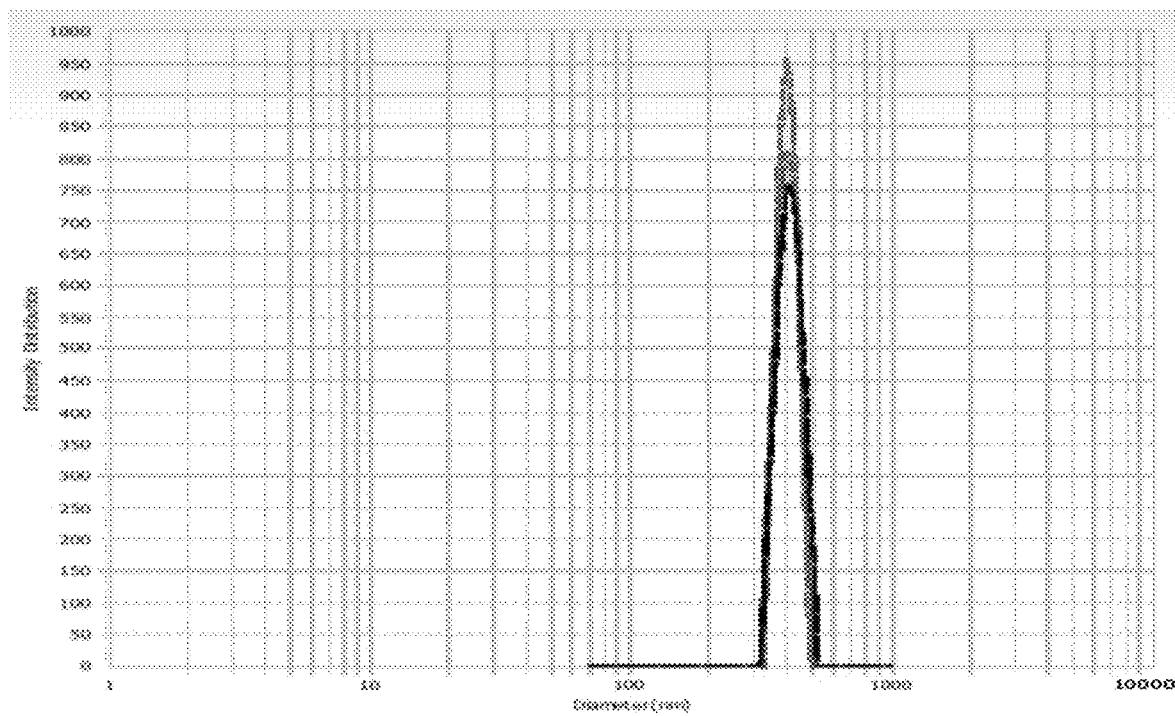
FIG. 6 is a result of measuring the particle size of the composite of the cyclodextrin-based covalent organic framework containing retinol and succinylated chitosan using Photal, ELS-Z.

The particle distribution of the composite of CD-COF containing retinol and succinylated chitosan prepared in Example 2 was measured using Photal and ELS-Z, and is shown in FIG. 6. As a result of the measurement, it can be known that the average particle size of the composite was 408.8 nm.

Figure 7:
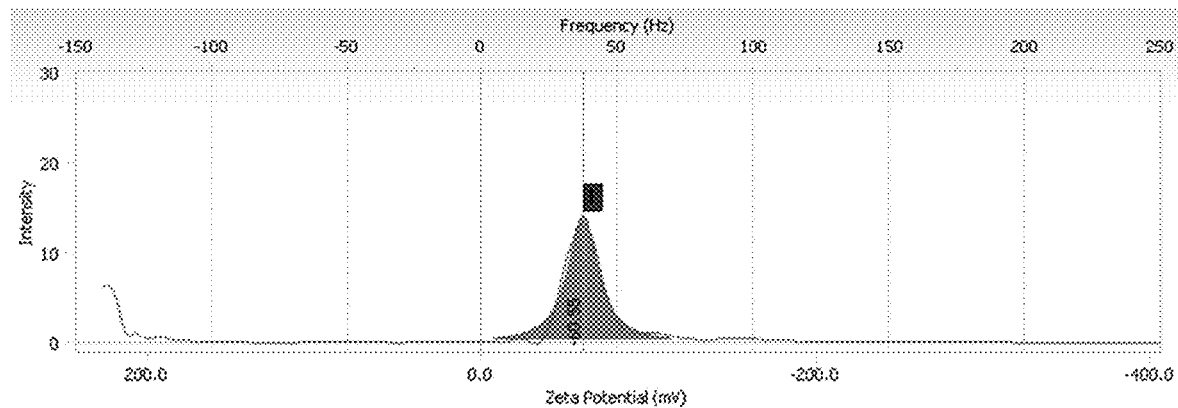
FIG. 7 is a result of measuring the zeta potential using Photal and ELS-Z to measure the stability of the composite of the cyclodextrin-based covalent organic framework containing retinol and succinylated chitosan.

Experimental Example 2: Measurement of Stability of the Composite of CD-COF Containing Retinol and Polymer In order to measure the stability of the composite of CD-COF containing retinol and succinylated chitosan prepared in Example 2, the zeta potential was measured using Photal and ELS-Z, and the results are shown in FIG. 7. As a result of the measurement, it can be known that the potential of the particle was stable at −60.55 mV.

Figure 8:
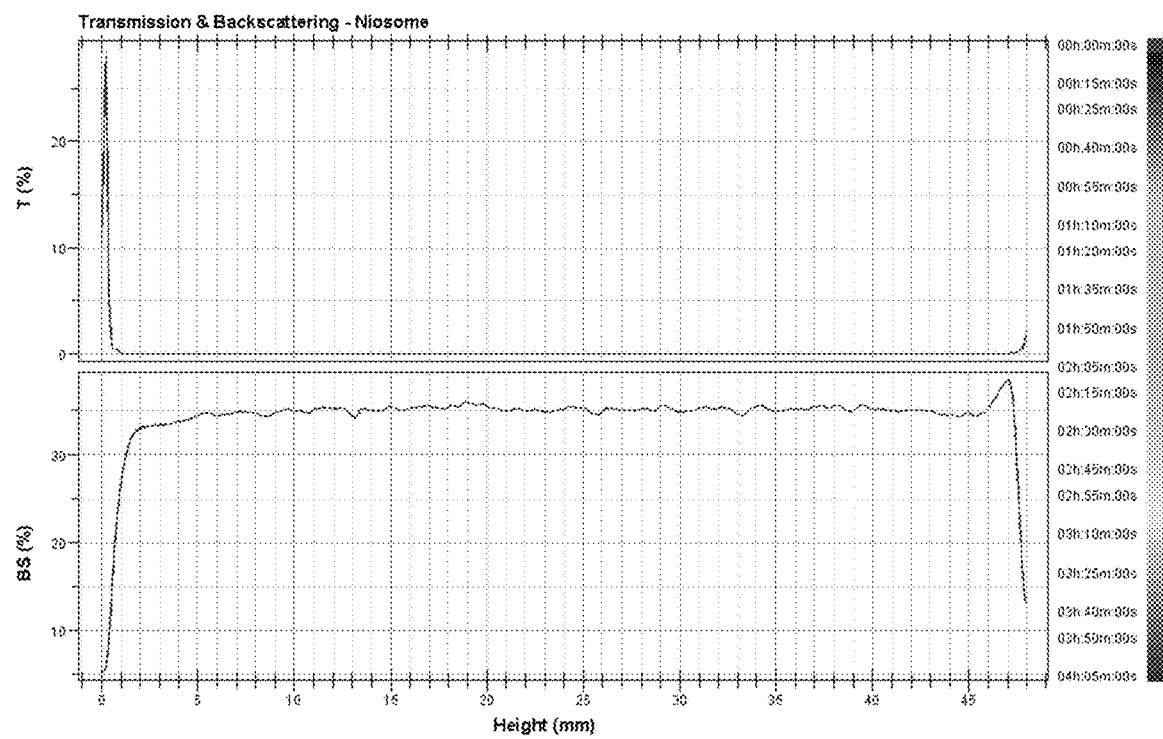
FIG. 8 is a result of measuring the stability of the composite of the cyclodextrin-based covalent organic framework containing retinol and succinylated chitosan using Turbiscan.

Experimental Example 3: Measurement of Stability of the Composite of CD-COF Containing Retinol and Polymer As a result of measurement of the stability of the composite of CD-COF containing retinol and succinylated chitosan prepared in Example 2 using Turbiscan, it can be known that the composite was stable since there was little change in ΔT and ABS over time (FIG. 8).

Experimental Example 4: Powder X-Ray Diffraction Test

Figure 9:
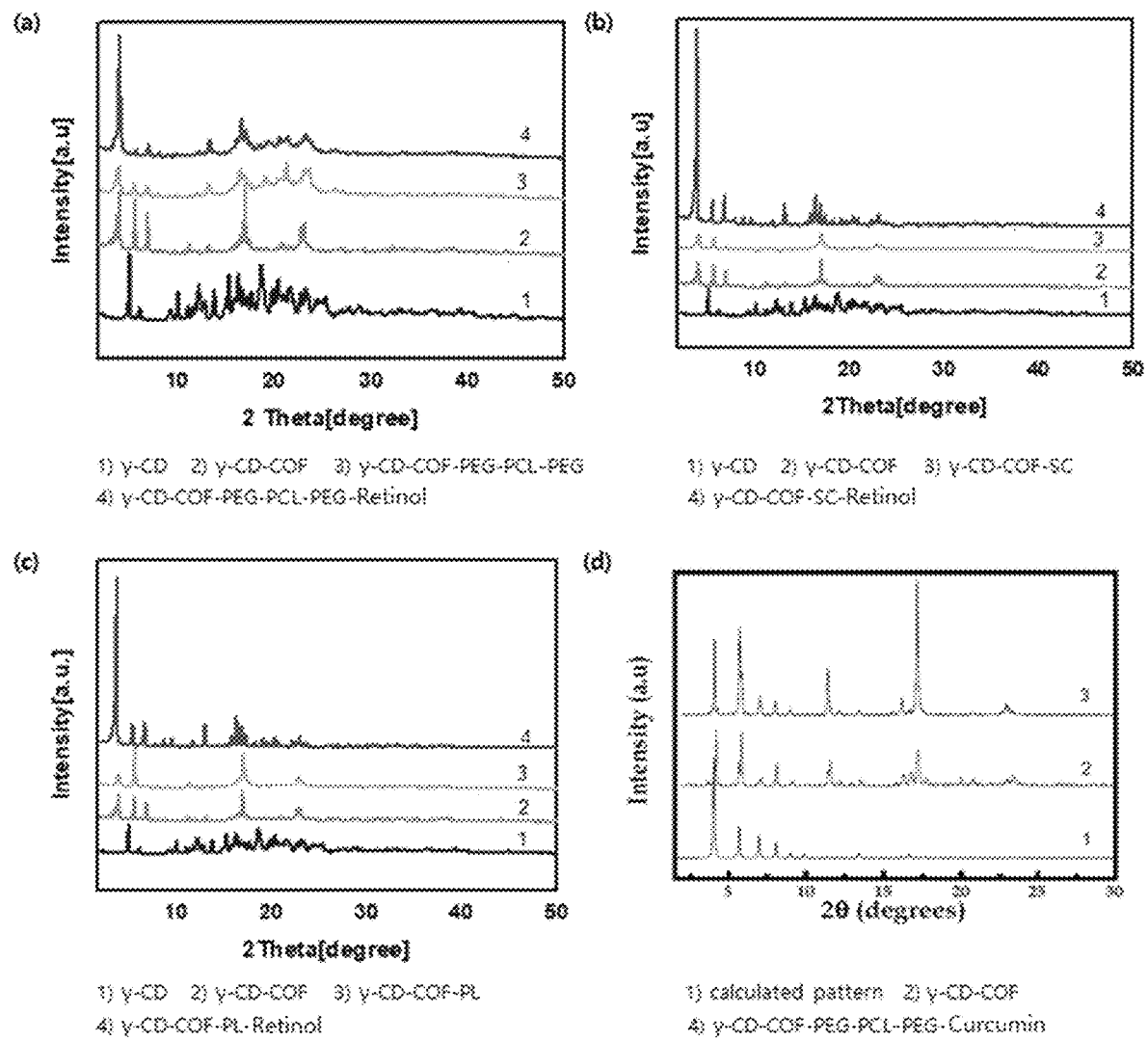
FIG. 9 is a result of powder X-ray diffraction test (XRD) (γ-CD: gamma-cyclodextrin, COF: covalent organic framework, PEG-PCL-PEG: triblock copolymer of PEG-PCL-PEG, SC: succinylated chitosan, PL: pullulan-poly-(L)-lactic acid).

A powder X-ray diffraction test (XRD) of the composite of CD-COF containing retinol and polymer prepared in Example 2 and the composite of CD-COF containing curcumin and polymer prepared in Example 3 was performed, and the results are shown in FIG. 9. As can be seen from the results of FIG. 9, it can be known that each complex was well synthesized as a certain peak appeared.

Experimental Example 5: Fourier-Transform Infrared Spectroscopy (FTIR) Test

Figure 10:
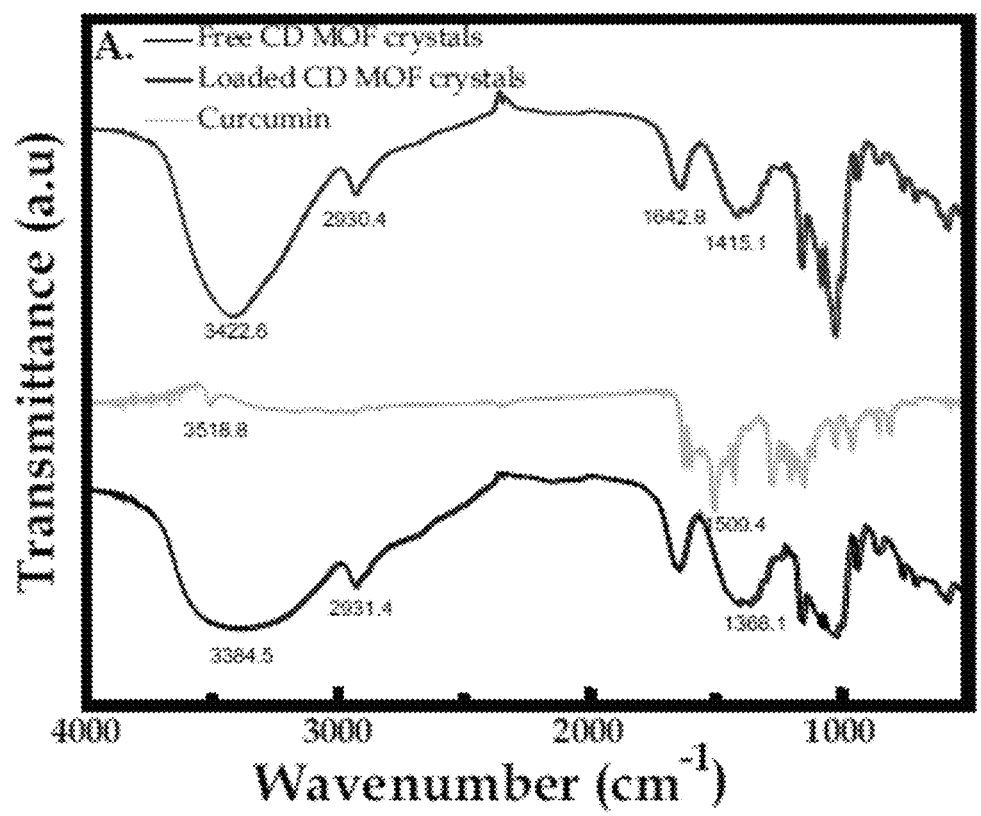
FIG. 10 is a result of measuring the composite of the cyclodextrin-based covalent organic framework containing curcumin and polymer prepared in Example 3 by Fourier transform infrared spectroscopy.

The measurement results of the composite of CD-COF containing curcumin and the polymer prepared in Example 3 by Fourier-transform infrared spectroscopy (FTIR) are shown in FIG. 10.

Experimental Example 6: Freeze Electron Microscopy

Figure 11:
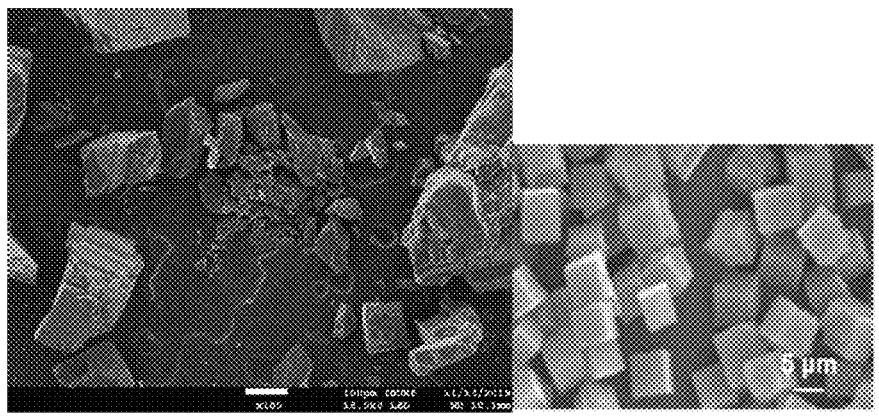
FIG. 11 is an enlarged photograph of the cyclodextrin-based covalent organic framework and the composite prepared in the Preparation Examples and Examples using a freezing electron microscope (γ-CD: gamma-cyclodextrin, COF: covalent organic framework, PEG-PCL-PEG: triblock copolymer of PEG-PCL-PEG, SC: succinylated chitosan, PL: pullulan-poly-(L)-lactic acid).
Figure 11:
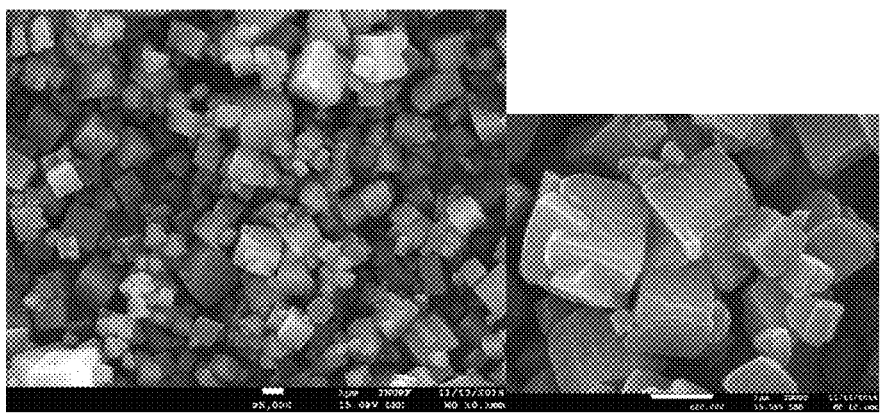
Figure 11:
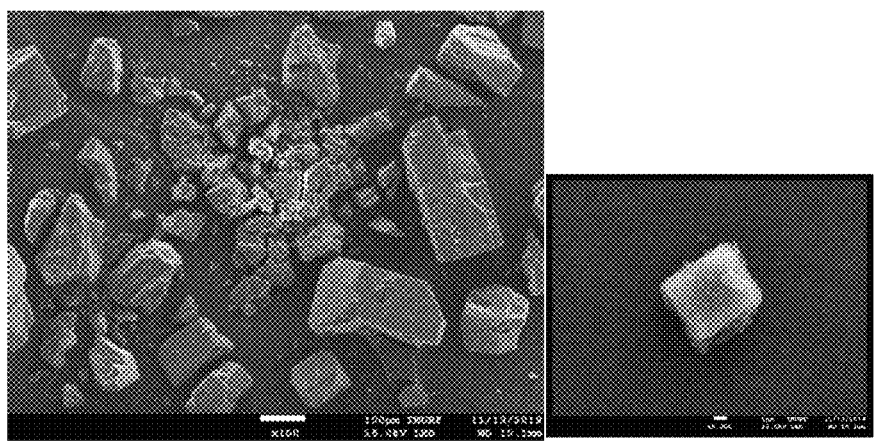
Figure 11:
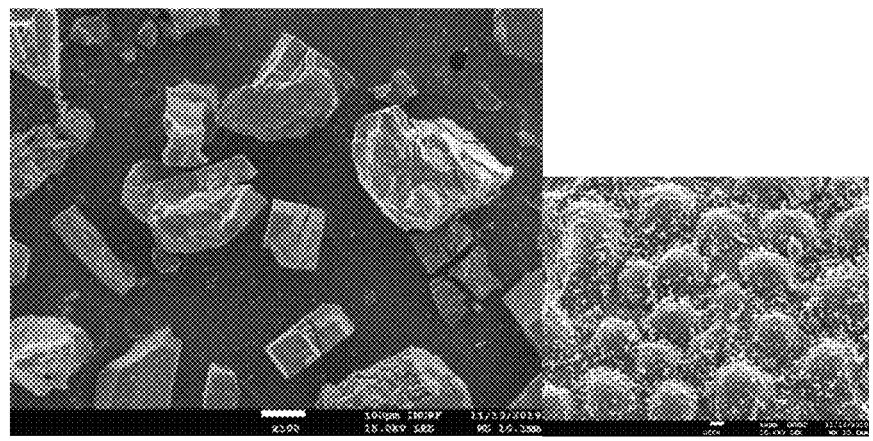
Figure 11:
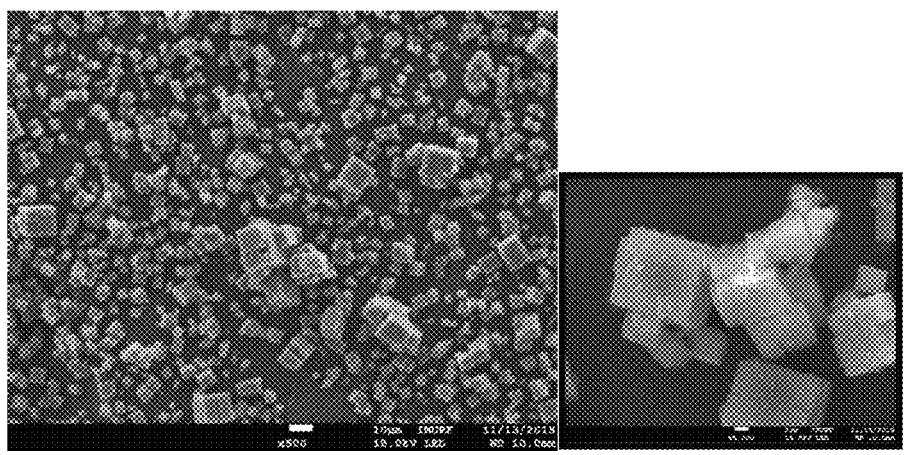
Figure 11:
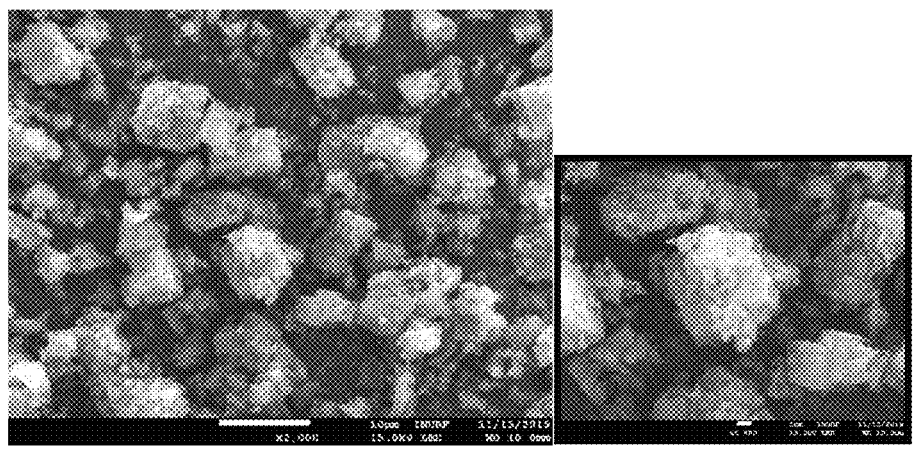
Figure 11:
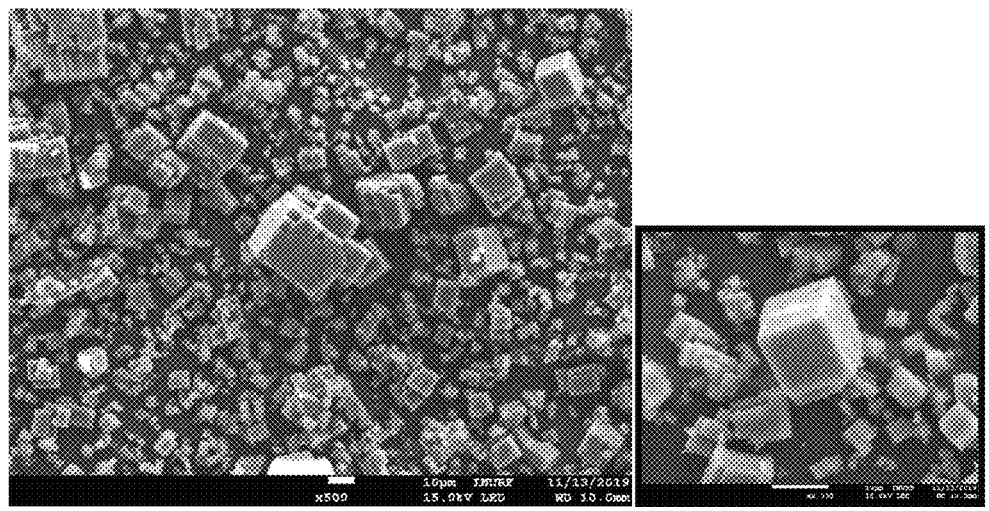
Figure 11:
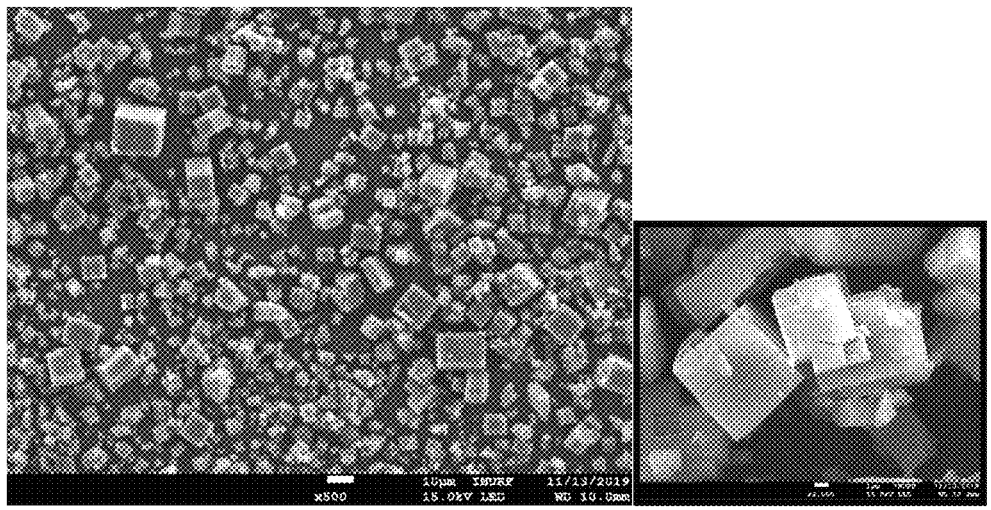

The CD-COFs and composites prepared in Preparation Examples and Examples were photographed. Since the particle size is too fine to measure with a general optical microscope, it was photographed using a freezing electron microscope (JEM 1010, JEOL, Japan) (FIG. 11). It can be known that the composites of CD-COF and polymer were well formed, and retinol was well attached to them.

Experimental Example 7: Transdermal Absorption Promotion Effect Test

Liposomes (liposome A) having a composite of CD-COF containing 10% retinol and succinylated chitosan and general liposomes (liposome B) were prepared with the composition shown in Table 19 below, respectively.

TABLE 19

| Ingredient | Liposome A | Liposome B |
| --- | --- | --- |
| Composite of CD-COF containing 10% retinol and succinylated chitosan | 10 | — |
| Saturated lecithin | 3 | 3 |
| Sodium stearolyl glutamate | 0.8 | 0.8 |
| Beeswax | 1 | 1 |
| Macadamia nut oil | 10 | 10 |
| Retinol | — | 1 |
| Distilled water | 75.2 | 84.2 |
| Total | 100 | 100 |

(Unit: % by weight)

The artificial skin, Neoderm (Tego Science, Korea) was mounted to a Franz-type diffusion cell (Lab Fine Instruments, Korea). 50 mM phosphate buffer (pH 7.4, 0.1 M NaCl) was added to a receptor cell (5 ml) of the Franz-type diffusion cell. A diffusion cell was then mixed and diffused at 600 rpm, 32° C., and 50 µl of Liposome A and Liposome B, respectively, were added to donor cells. Absorption and diffusion were carried out at a predetermined time, and the area of the skin where the absorption and diffusion were carried out was 0.64 cm$^2$. After finishing the absorption and diffusion of the active ingredient, the residues—which were not absorbed and remained on the skin—were cleaned with dried Kimwipes™ or 10 ml of ethanol. The skin in which the active ingredient was absorbed and diffused was homogenized by the use of a tip-type homogenizer, and retinol absorbed into the skin was then extracted with 4 ml of dichloromethane. The extract was then filtrated with a 0.45 µm nylon membrane filter. The content of retinol was measured by high-performance liquid chromatography with the following conditions, and the results are represented in Table 20.

TABLE 20

|  | Transdermal absorption (µg) | Rate of increase |
| --- | --- | --- |
| Liposome A | 0.4640 | 15.73% |
| Liposome B | 0.2950 | — |

A) Column: C18 (4.6 × 200 mm, 5 µm)
B) Mobile phase: methanol:hexane = 2:1
C) Flow rate: 0.8 ml/min
D) Detector: UV 275 nm As can be seen from Table 20, it can be known that retinol was encapsulated in a composite of CD-COF and polymer, and efficiently delivered into the skin in the present invention.

What is claimed is:

1. A composite for transdermal delivery comprising a cyclodextrin-based metal-organic framework (CD-MOF), a polymer, and an active ingredient,
   wherein the cyclodextrin-based metal-organic framework is prepared from cyclodextrin and potassium hydroxide (KOH); and
   wherein the polymer is selected from the group consisting of pullulan, polylactic acid, pullulan-poly-(L)-lactic acid, a triblock copolymer of polyethylene glycol (PEG)-polycaprolactone (PCL)-polyethylene glycol (PEG) and mixtures thereof.

2. The composite for transdermal delivery according to claim 1, wherein the cyclodextrin is alpha-cyclodextrin, beta-cyclodextrin or gamma-cyclodextrin.

3. The composite for transdermal delivery according to claim 2, wherein the cyclodextrin is gamma-cyclodextrin.

4. The composite for transdermal delivery according to claim 1, wherein the polymer is selected from the group consisting of pullulan-poly-(L)-lactic acid, a triblock copolymer of polyethylene glycol (PEG)-polycaprolactone (PCL)-polyethylene glycol (PEG) and mixtures thereof.

5. The composite for transdermal delivery according to claim 1, wherein 0.01 to 100 parts by weight of the polymer are included based on 10 parts by weight of the cyclodextrin-based metal-organic framework.

6. The composite for transdermal delivery according to claim 1, wherein the active ingredient is one or more selected from the group consisting of a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent, a natural product, oil, wax, butter, paraffin, a higher fatty acid, an ester and a silicone.

7. A cosmetic composition comprising the composite for transdermal delivery according to claim 1.

8. The cosmetic composition according to claim 7, comprising 1 to 60% by weight of the composite for transdermal delivery.

9. A method for preparing a composite for transdermal delivery comprising:
   i) dissolving cyclodextrin, potassium hydroxide (KOH), a polymer, and an active ingredient in a solvent,
   ii) forming crystals in the crystallization solvent from the solution obtained in step (i) using a gas diffusion crystallizer and
   iii) washing the crystals formed in step (ii) and drying the crystals, wherein the polymer is selected from the group consisting of pullulan, polylactic acid, pullulan-poly-(L)-lactic acid, a triblock copolymer of polyethylene glycol (PEG)-polycaprolactone (PCL)-polyethylene glycol (PEG) and mixtures thereof.

10. The method for preparing a composite for transdermal delivery according to claim 9, wherein the cyclodextrin is alpha-cyclodextrin, beta-cyclodextrin or gamma-cyclodextrin.

11. The method for preparing a composite for transdermal delivery according to claim 10, wherein the cyclodextrin is gamma-cyclodextrin.

12. The method for preparing a composite for transdermal delivery according to claim 9, wherein the polymer is selected from the group consisting of pullulan-poly-(L)-lactic acid, a triblock copolymer of polyethylene glycol (PEG)-polycaprolactone (PCL)-polyethylene glycol (PEG) and mixtures thereof.

13. The method for preparing a composite for transdermal delivery according to claim 9, wherein the solvent of step (i) is selected from the group consisting of water, propylene glycol and mixtures thereof.

14. The method for preparing a composite for transdermal delivery according to claim 9, wherein 10 to 200 parts by weight of cyclodextrin, 1 to 100 parts by weight of potassium base and 0.01 to 50 parts by weight of the polymer are dissolved based on 100 parts by weight of the solvent in step (i).

15. The method for preparing a composite for transdermal delivery according to claim 9, wherein the crystallization solvent in step (ii) is selected from the group consisting of methanol, ethanol and mixtures thereof.

16. The method for preparing a composite for transdermal delivery according to claim 9, wherein the active ingredient is one or more selected from the group consisting of a moisturizer, a whitening agent, an anti-wrinkle agent, a UV blocking agent, a hair growth promoter, vitamin or a derivative thereof, amino acid or peptide, an anti-inflammatory agent, an acne therapeutic agent, a microbicide, female hormone, a keratolytic agent, a natural product, oil, wax, butter, paraffin, a higher fatty acid, an ester and a silicone.

* * * * *